United States Patent [19]

Nishimura et al.

[11] Patent Number: 4,515,404
[45] Date of Patent: May 7, 1985

[54] SEAT SLIDING DEVICE

[75] Inventors: Shinichi Nishimura, Zama; Saburo Mizuno; Kiyoshi Miyamoto, both of Yokohama, all of Japan

[73] Assignees: Nissan Motor Company, Limited; Ohio Seisakusho Co., Ltd., both of Yokohama, Japan

[21] Appl. No.: 447,132

[22] Filed: Dec. 6, 1982

[30] Foreign Application Priority Data

Jan. 21, 1982 [JP] Japan .................................. 57-6739

[51] Int. Cl.³ ................................................ B60N 1/02
[52] U.S. Cl. ................................. 296/65 R; 308/6 R; 248/429
[58] Field of Search ...................... 296/65 R; 428/429; 308/6 R, 3.6, DIG. 14

[56] References Cited

U.S. PATENT DOCUMENTS

| 2,606,091 | 8/1952 | Buchy et al. | 312/346 |
| 2,927,627 | 3/1960 | Lohr | 296/65 R |
| 3,313,512 | 4/1967 | Colautti et al. | 248/424 |
| 3,476,435 | 11/1969 | Hitzelberger | 296/65 |
| 3,847,452 | 11/1974 | Harder, Jr. | 308/6 R |
| 4,210,303 | 7/1980 | Torta et al. | 248/429 |
| 4,395,011 | 7/1983 | Torta | 248/393 |

FOREIGN PATENT DOCUMENTS 1365966 9/1972 United Kingdom .
1291733 10/1972 United Kingdom .

Primary Examiner—Robert R. Song
Attorney, Agent, or Firm—Lane, Aitken & Kananen

[57] ABSTRACT

In a seat sliding device comprising a stationary rail, a movable rail slidable on and along the stationary rail to carry a seat, and a plastic slide block moulded on the movable rail in a manner to be disposed between these two rails to improve the sliding characteristics of the movable rail relative to the stationary rail, there is proposed a measure in which the slide block is divided into two sections in the longitudinal direction of the movable rail, leaving a predetermined clearance between the two sections.

7 Claims, 12 Drawing Figures

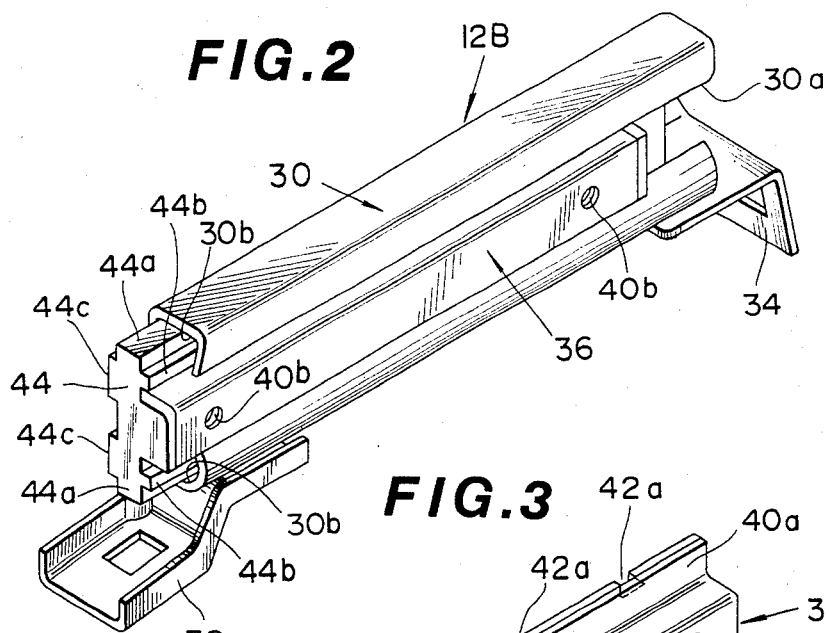
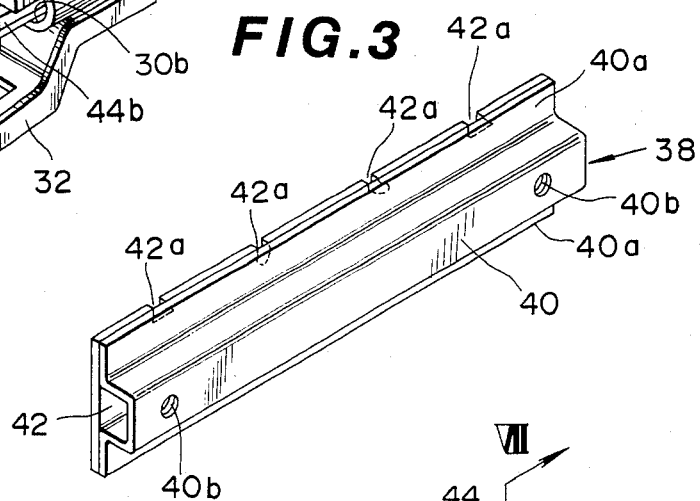
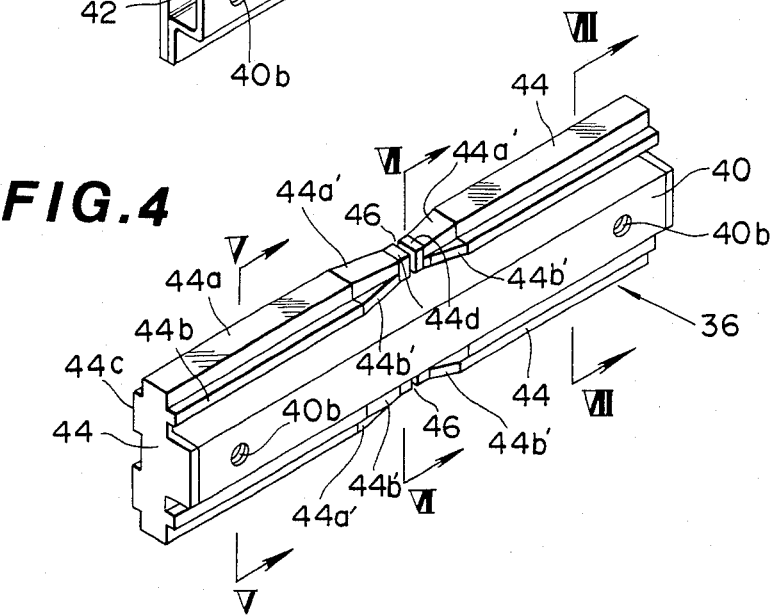

SEAT SLIDING DEVICE

BACKGROUND OF THE INVENTION

1. Field of the Invention

The present invention relates in general to a seat sliding device of a motor vehicle, and more particularly to a seat sliding device which comprises a stationary rail secured to the vehicle floor and a movable rail secured to the seat, the movable rail being slidable on and along the stationary rail to carry the seat in the fore-and-aft directions.

2. Description of the Prior Art

In order to provide the seat occupant (or driver) with a comfortable sitting position, seat sliding devices are widely used in a motor vehicle, which function to move the seat forward or rearward to a desired position. Some of these devices are of a type comprising a stationary metal rail secured to the vehicle floor and a movable metal rail secured to the seat. The movable rail slides on and along the stationary rail to achieve the forward or rearward movement of the seat relative to the vehicle floor. In such devices, a plastic slide block is attached to one of the two rails in a manner to be interposed between these two rails, for the purpose of improving the sliding characteristics of the movable rail relative to the stationary rail. Usually, the plastic slide block on the rail is provided by way of injection moulding using the selected rail as a core. The slide block thus moulded on the rail is inevitably formed to extend throughout the length of the rail. In other words, the rail has thereon and therethroughout an elongated slide block of plastics secured thereto.

However, in such a rail having the elongate plastic slide block, a peel off phenomenon of the slide block has sometimes occurred particularly in a cold season. Experiment has revealed that such undesirable phenomenon is caused by the difference in contractability between the plastic slide block and the metal rail. In fact, when exposed to a cold circumstance, the slide block is applied with a remarkable tensile stress because these two parts having different contractibilities are secured to each other. Thus, in the worst case, the slide block on the rail is broken deteriorating the sliding characteristics of the seat sliding device.

SUMMARY OF THE INVENTION

It is therefore an essential object of the present invention to provide an improved seat sliding device which is free of the above-mentioned trouble.

According to the present invention, there is provided a seat sliding device for moving a seat relative to a floor. The device comprises a stationary rail secured to the floor; a movable rail secured to the seat, the movable rail being slidable on and along the stationary rail to achieve the movement of the seat; and a slide block of plastics moulded on a selected one of the stationary and movable rails in a manner to be disposed between these rails in order to improve the sliding characteristics of the movable rail relative to the stationary rail, wherein the slide block is divided into two sections in the longitudinal direction of the selected rail, leaving a predetermined clearance between these two sections.

BRIEF DESCRIPTION OF THE DRAWINGS

Other objects and advantages of the present invention will become clear from the following description when taken in conjunction with the accompanying drawings, in which:

FIG. 2 is a perspective view of the seat sliding device of the present invention;

FIG. 3 is a perspective view of a rail proper of a movable rail;

FIG. 4 is a perspective view of the entire construction the movable rail;

DETAILED DESCRIPTION OF THE INVENTION

Figure 1:
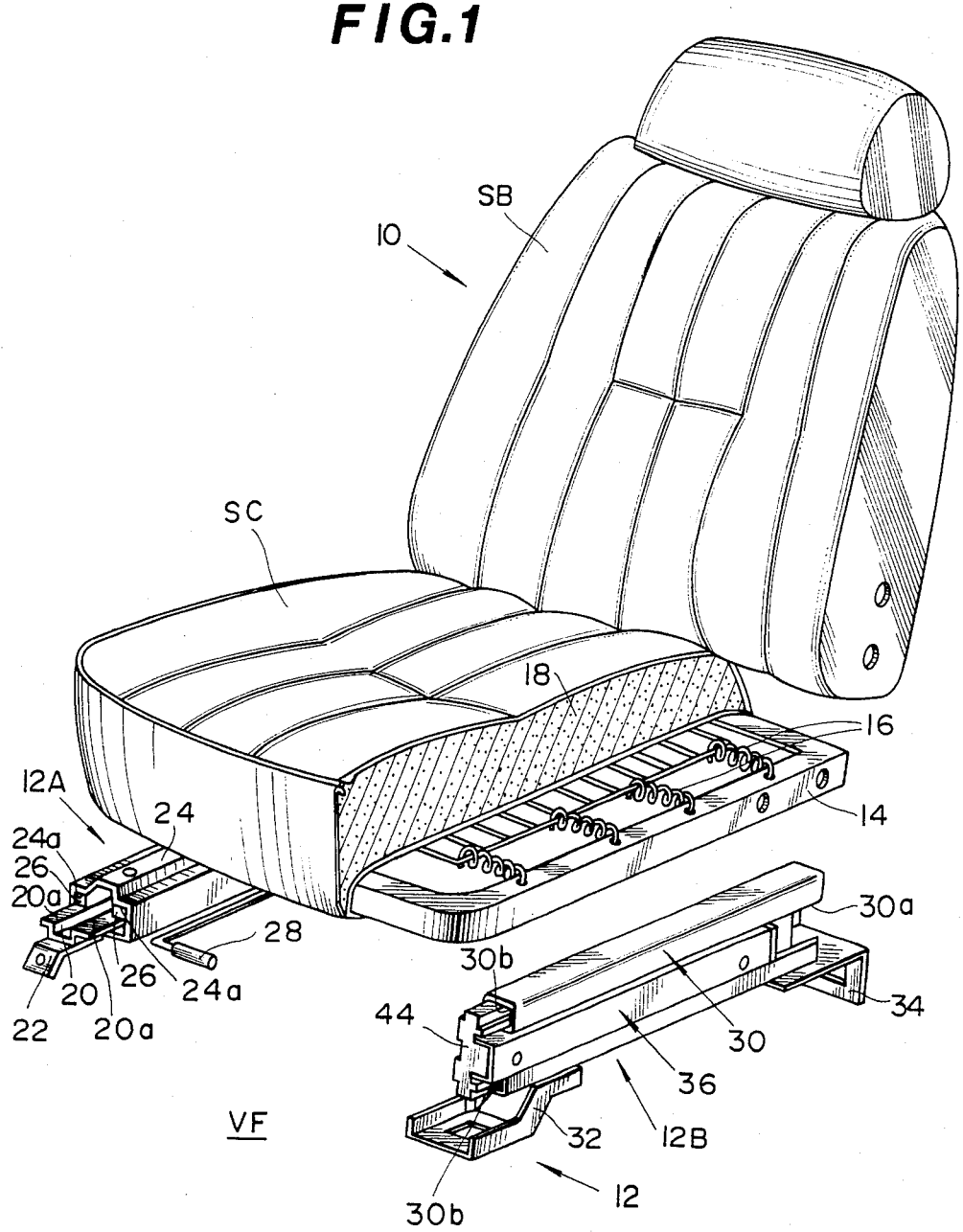
FIG. 1 is a partially broken perspective view of a seat mounted on a seat sliding device according to the present invention.
Figure 5:
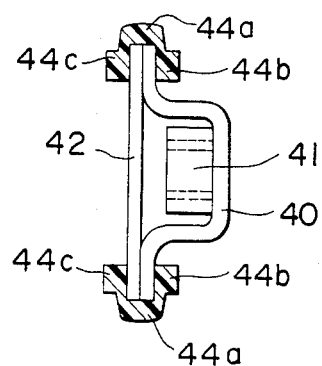
FIGS. 5, 6 and 7 are sectional views taken on the lines V—V, VI—VI and VII—VII of FIG. 4.
Figure 6:
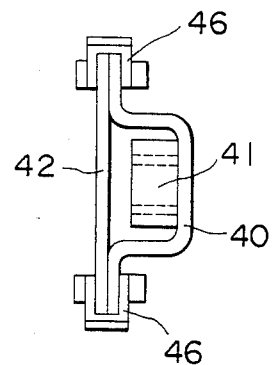
Figure 7:
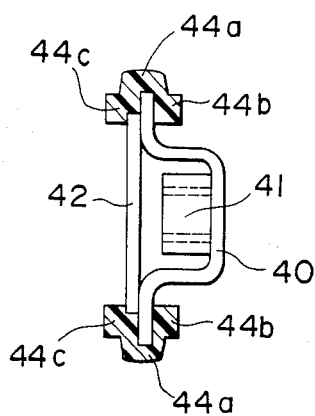
Figure 8:
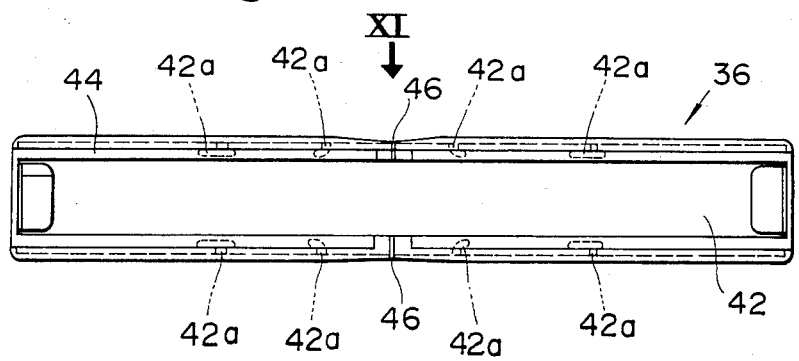
FIG. 8 is a back view of the movable rail, taken from the direction of the arrow VIII of FIG. 4.
Figure 9:
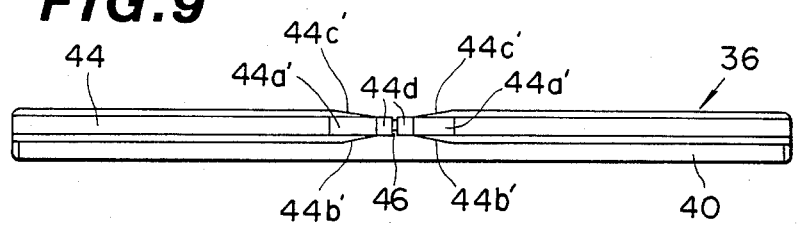
FIG. 9 is a plan view of the movable rail.
Figure 10:
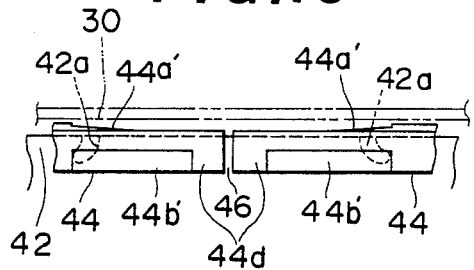
FIG. 10 is a partial and enlarged view taken from the direction of the arrow X of FIG. 9.
Figure 11:
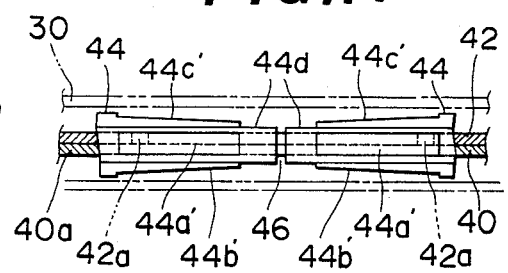
FIG. 11 is a partial, enlarged and partially broken view taken from the direction of the arrow XI of FIG. 8.

Referring to FIG. 1, there is shown a seat 10 of, for example, a motor vehicle which is mounted on a seat sliding device 12 according to the present invention.

The seat 10 comprises generally a seat cushion SC including a frame 14, springs 16 and a pad 18, and a seat back SB including similar parts to those of the seat cushion SC.

The seat sliding device 12 on which the seat 10 is mounted comprises generally two groups of sliding mechanisms 12A and 12B. Since one mechanism 12A has a known construction, the description of it will be made briefly hereinnext with reference to FIG. 1.

The mechanism 12A comprises a stationary metal rail 20 fixed to a vehicle floor VF by means of brackets 22 (only one bracket is shown). The stationary rail 20 is of a channel member having spaced flanges 20a which extend in the opposed directions. A movable metal rail 24 is secured to the frame 14 of the seat cushion SC and longitudinally slidably supported on the stationary rail 20 with its inner shoulder portions 24a slidably riding on the flanges 20a of the stationary rail 20. For achieving better sliding movement of the movable rail 24 relative to the stationary rail 20, slide blocks 26 made of, for example, plastics are secured to the inner shoulder portions of the movable rail 24. With this, the longitudinal movement of the movable rail 24 relative to the stationary rail 20 induces the fore-and-aft movements of the seat 10 relative to the vehicle floor VF. Designated by numeral 28 is a control lever of a known seat position setting device which is operatively incorporated with the sliding mechanism 12A.

The other mechanism 12B will be described in detail with reference to FIGS. 2 to 12 because the present invention is applied directly thereto. The mechanism 12B comprises, as is best seen from FIG. 2, an elongate stationary metal rail 30 which is connected to the vehicle floor VF through front and rear brackets 32 and 34. The stationary rail 30 is constructed to have a generally C-shaped cross section and arranged so as to have the elongate opening 30a thereof oriented laterally outwardly with respect to the seat 10, as will be understood from FIG. 1. An elongate movable rail 36 is longitudinally movably received in the stationary rail 30. The movable rail 36 is secured or bolted to the seat frame 14 through suitable brackets (not shown) so that the longitudinal movement of the movable rail 36 relative to the stationary rail 30 induces the fore-and-aft movements of the seat 10 relative to the vehicle floor VF.

The entire construction of the movable rail 36 is shown by FIG. 4, which comprises generally a rail proper 38 of metal as shown by FIG. 3 and a slide block 44 secured to the rail proper 38. The rail proper 38 comprises a metal channel member 40 having outwardly extending opposed flanges 40a, and a flat metal back member 42 securely attached, by for example welding, to the flanges 40a of the channel member 40. Designated by numerals 40b are holes into which bolts (not shown) extending from the seat frame-mounted brackets are inserted and engaged with nuts 41 (see FIGS. 5 to 7) which are welded to the back side of the channel member 40. The back member 42 has a rectangular shape matching with the channel member 40, as shown. The back member 42 is formed at both sides thereof with a plurality of recesses 42a. For the reason which will become clear as the description proceeds, each of the recesses has a dovetail form. As is seen from FIG. 4, the slide block 44 made of, for example, plastics such as polyacetal resins or the like, is secured to the rail proper 38 for the purpose of achieving better sliding movement of the movable rail 36 relative to the stationary rail 30. The plastic slide block 44 is moulded to cover the flange portions of the rail proper 38 and the longitudinal both ends of the same and has an external shape to be slidably guided by the guiding grooves 30b of the stationary rail 30. With the dovetail recesses 42a of the rail proper 38, the connection between the rail proper 38 and the slide block 42 is tightly made. The slide block 44 mounted on each of the flange portions 40a of the rail proper 38 consists of two identical but completely separated groups which are disposed on the longitudinally opposed halves of the rail proper 38, each comprising a vertically projected first ridge portion 44a, a laterally outwardly projected second ridge portion 44b and a laterally inwardly projected third ridge portion 44c. As is understood from FIG. 2, the top surface of each ridge portion 44a, 44b or 44c is in a slidable contact with the corresponding inner wall of the guide groove 30b of the stationary rail 30. As is seen from FIG. 4, each group slide block 44 has an inside end portion which is gradually decreased in thickness and terminates at a small rectangular portion 44d of the block 44. Thus, slanted surfaces 44a', 44b' and 44c' are formed on the first, second and third ridge portions 44a, 44b and 44c at the inside end portioon of the slide block 44, as shown. Preferably, the decreasing thickness decreasing of the slide block 44 starts from the vicinity of the position where one selected dovetail recess 42a is located, as will be understood from FIG. 11. Now, it is important in the invention to provide a suitable clearance or gap 46 between the two groups of the sliding block, that is, between the small rectangular portion 44d of one group and that of the other group.

Preferably, the formation of the slide block 44 and the clearance 46 between the two groups is achieved by practicing the following method.

Upon moulding, melted plastic material is applied or injected to the entire of each flange portion 40a to form a monoblock construction of the slide block 44. The monoblock slide block 44 thus formed has a small rectangular portion of plastics by which the right and left parts (which correspond to the two identical groups mentioned hereinabove) of the block 44 are integrally connected. After curing, the middle portion of the small rectangular portion is shaved off from the rail proper 38 to provide the above-mentioned suitable clearance 46. The presence of such clearance will be seen from FIG. 6 which shows a sectional view taken on the line VI—VI of FIG. 4.

When the seat sliding mechanism 12B of the invention is exposed to a cold environment, each group of the sliding block 44 is applied with a tensile stress because of contraction difference between the slide block 44 and the rail proper 38. However, in the present invention, the dovetail shaped recesses 42a which seize the cured prastic slide block 44 can prevent separation of the block 44 from the rail proper 38. Assuming that the two groups of slide block are integrally connected at the small rectangular portion as in the conventional one, the monoblock slide block may be broken, upon occurrence of the tensile stress thereof, because of greater stress due to the lengthy construction of the block. In fact, dividing a united block into pieces induces a reduction in stress applied to each piece.

Figure 12:
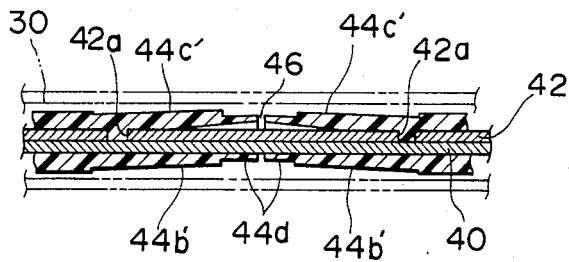
FIG. 12 is a view similar to FIG. 11, but showing a condition wherein the slide block on the movable rail is subjected to a severe cold condition.

Even if, by the tensile stress thereof, the inside end portion of each slide block 44 is raised in such a manner as is shown by FIG. 12, the raised portion does not engage or contact with the corresponding track wall of the stationary rail 30 because of the slanted construction thereof. Thus, even when such raising occurs, the sliding movement of the movable rail 36 relative to the stationary rail 30 is not affected.

When the seat sliding mechanism 12B of the invention is exposed to warm or heated environment, each slide block 44 expands greater than the rail proper 38. Thus, it is necessary to determine the dimension of the clearance 46 not to induce the contact of the inside end portions of the paired slide blocks 44 even under such high temperature condition.

Although, in the foregoing description, explanation has been made with respect to a slide block which is moulded to the movable rail, it is also possible in the invention to mould the block on the stationary rail.

What is claimed is:

1. A seat sliding device for moving a seat relative to a floor, comprising:
    a stationary rail secured to said floor;
    a movable rail secured to said seat and slidable on and along the stationary rail to achieve the movement of said seat; and
    a slide block of plastics moulded on a selected one of said stationary and movable rails in such a manner that the slide block is disposed between the two rails thereby improving the sliding characteristics of the movable rail relative to the stationary rail, wherein said slide block is divided into two sections in the longitudinal direction of the selected rail, leaving a predetermined clearance between these two sections, and wherein the two sections of said slide block cover the longitudinal both ends of the selected rail respectively.

2. A seat sliding device as claimed in claim 1, in which the selected rail on which said sliding block is moulded is formed with a plurality of dovetail shaped recesses into which the associated portions of said sliding block are securely received.

3. A seat sliding device as claimed in claim 2, in which said slide block comprises three radially outwardly projected ridge portions of which top surfaces are slidably engageable with the corresponding inside walls of a guide groove formed on the non-selected rail.

4. A seat sliding device for moving a seat relative to a floor, comprising:

a stationary rail secured to said floor;

a movable rail secured to said seat, said movable rail being slidable on and along the stationary rail to achieve the movement of said seat; and a slide block of plastics moulded on an elected one of said stationary and movable rails in a manner to be disposed between these rails in order to improve the sliding characteristics of the movable rail relative to said stationary rail, wherein said slide block is divided into two sections in the longitudinal direction of the selected rail, leaving a predetermined clearance between these two sections, wherein the selected rail on which said sliding block is moulded is formed with a plurality of dove-tail shaped recesses into which the associated portions of said sliding block are securely received, wherein said slide block comprises three radially outwardly projected ridge portions of which top surfaces are slidably engageable with the corresponding inside walls of a guide groove formed on the non-selected rail, and wherein the longitudinally inside end portion of each section of the slide block is decreased in thickness gradually with increase of the distance from the longitudinally outside end of the slide block, so that slanted surfaces are formed respectively on said three ridge portions at the longitudinally inside end portion of each section.

5. A seat sliding device as claimed in claim 4, in which each section of said slide block covers entirely a longitudinal end of the selected rail.

6. A seat sliding device as claimed in claim 4, in which said slide block is moulded on said movable rail.

7. A seat sliding device for moving a seat relative to a floor, comprising: a stationary rail secured to said floor, a movable rail secured to said seat and slidable on and along the stationary rail to achieve the movement of said seat relative to said floor, and a side block of plastics mounted to a selected one of said stationary and movable rails in such a manner that the slide block is disposed between these two rails in order to improve the sliding characteristics of said movable rail relative to said stationary rail, which device is characterized in that said slide block is moulded to the selected rail and is divided into two sections in the longitudinal direction of the selected rail leaving a predetermined clearance between these sections, and in that the two sections of said slide block cover the longitudinal both ends of the selected rail respectively.

* * * * *